United States Patent [19]

Konishi et al.

[11] Patent Number: 4,546,390

[45] Date of Patent: Oct. 8, 1985

[54] COMBINATION STILL AND MOTION PICTURE ELECTRONIC CAMERA/RECORDER

[75] Inventors: Masahiro Konishi, Minami-ashigara; Makoto Murakoshi, Tokyo, both of Japan

[73] Assignee: Fuji Photo Film Co., Ltd., Kanagawa, Japan

[21] Appl. No.: 392,520

[22] Filed: Jun. 28, 1982

[30] Foreign Application Priority Data

Jun. 29, 1981 [JP] Japan .................. 56-101059

[51] Int. Cl.[4] .............................................. H04N 5/78
[52] U.S. Cl. .................................. 360/10.3; 360/33.1; 358/906
[58] Field of Search ...................... 360/33.1, 9.1, 10.1, 360/10.3; 358/138, 906

[56] References Cited

U.S. PATENT DOCUMENTS

| | | | |
|---|---|---|---|
| 3,568,063 | 3/1971 | Brown | 358/138 X |
| 4,063,290 | 12/1977 | Metildi et al. | 358/138 X |
| 4,131,919 | 12/1978 | Lloyd et al. | 358/906 X |
| 4,133,009 | 1/1979 | Kettler et al. | 358/906 X |
| 4,183,065 | 1/1980 | Rhody et al. | 360/9.1 |
| 4,263,623 | 4/1981 | Woo et al. | 360/10.3 |
| 4,339,775 | 7/1982 | Lemke et al. | 360/10.3 |

*Primary Examiner*—Aristotelis M. Psitos
*Attorney, Agent, or Firm*—Staas & Halsey

[57] ABSTRACT

An electronic combination still-movie camera with which it is possible to take both still and motion pictures through the use of a simple recording device of audio grade. Stored information from optoelectro transducers is read out by a readout circuit at a still-mode scanning speed in the case of taking a still picture and at a movie-mode scanning speed in the case of taking a motion pictures. In the former case, signals corresponding to all pictures elements are sent to a recording unit for recording and, in the latter case, signals such that at least one of the number of picture elements per frame and the number of quantize bits per picture element is smaller than in the former case are sent to the recording unit for recording.

4 Claims, 10 Drawing Figures

COMBINATION STILL AND MOTION PICTURE ELECTRONIC CAMERA/RECORDER

BACKGROUND OF THE INVENTION

1. Field of the Invention

The present invention relates to an electronic combination still and movie camera with which it is possible to take both still and motion pictures purely electronically.

2. Description of the Prior Art

Recently an electronic camera has been proposed which is capable of taking a purely electronic still picture of an object and recording it by the combined use of an optoelectro transducer of a solid state image sensor or pickup tube and a recording device, such as a magnetic tape recorder. This type of electronic camera is attracting attention as a future substitute for the existing optical camera which requires a chemical treatment of the film.

In the case of taking a still picture, high picture quality is generally required. Thus, an optoelectro transducer with a large number of picture elements is needed and the number of quantize bits per picture element must be large. Since the frame speed is as low as 3 to 5 frames per second at maximum, even in the case of continuous photographing, the read rate of the optoelectro transducer may be low and, after all, the quantity of information required to record per unit time is small. Accordingly, the recording device therefor may be, for instance, a magnetic recording device of audio grade, by which the camera can be made small and inexpensive, and it is considered that such a camera would be a good match for the conventional optical camera.

By the way, it would be very convenient if still and motion pictures could be taken by one camera, which is difficult with the existing camera but can be accomplished relatively easily with a purely electronic camera because its arrangement is equivalent to a movie camera. In the case of taking a motion picture, however, the frame speed is high, for example, in the case of television, the frame speed is as high as 30 frames per second, and the quantity of information stored per unit time is larger than in the case of still photography; therefore, it is considered to be difficult to take motion pictures using an electronic camera with such a magnetic recording device of audio grade as mentioned above. For taking both still and motion pictures by one camera, it is necessary to employ a high-speed magnetic recording system of high accuracy sufficient to effect video-speed recording, accordingly, the camera is bulky and expensive.

SUMMARY OF THE INVENTION

It is therefore an object of the present invention to provide an electronic combination still and movie camera which takes both still and motion pictures purely electronically.

Another object of the present invention is to provide an electronic combination still and movie camera with a simple recording device of audio grade by which motion pictures as well as still pictures can be taken.

Yet another object of the present invention is to provide an inexpensive, small electronic combination still and movie camera.

In an electronic camera solely for still photography, maximum capabilities of its recording device are generally limited to such an extent that still pictures can be taken at a speed of 3 to 5 frames per second at maximun in order to make it small in size and inexpensive. Accordingly, it is difficult to photograph information for a moving picture, which requires about ten times more frames per second than in the case of a still picture, under the same conditions as those for still photography. In the case of a moving picture, even if the number of picture elements per frame and the number of quantized bits per picture element is reduced to some extent as compared with those in the case of still photography, that is, even if the picture quality of the moving picture is theoretically lowered as compared with that of the still picture, the moving picture is visually recognized as of the same picture quality as the still picture. The present invention reduces the quantity of information per frame by decreasing at least one of the number of picture elements per frame and the number of quantized bits per picture element as compared with that in the case of taking a still picture. Thus, movie information of about 30 frames per second can be recorded with a recording capacity for still picture information of 3 to 5 frames per second and, consequently, the movie information can be recorded sufficiently by a magneitc recording device of audio grade. To perform this, the electronic combination still and movie camera comprises a sensor for spatially sampling an optical image corresponding to picture elements to convert the optical image into an electric signal, a readout circuit for reading out stored information from the sensor at a still-mode scanning speed, in the case of taking a still picture, and at a movie-mode scanning speed, in the case of taking a motion picture, a recording unit for recording signals at a fixed speed, and a mode select unit for sending to the recording unit signals corresponding to all picture elements in the case of signals being read out from the readout circuit at the still-mode scanning speed and for sending to the recording unit signals such that at least one of the number of picture elements per frame and the number of quantized bits per picture element is smaller than in the case of taking a still picture when the signals are read out from the readout circuit at the movie-mode scanning speed.

DESCRIPTION OF THE PREFERRED EMBODIMENTS

Figure 1:
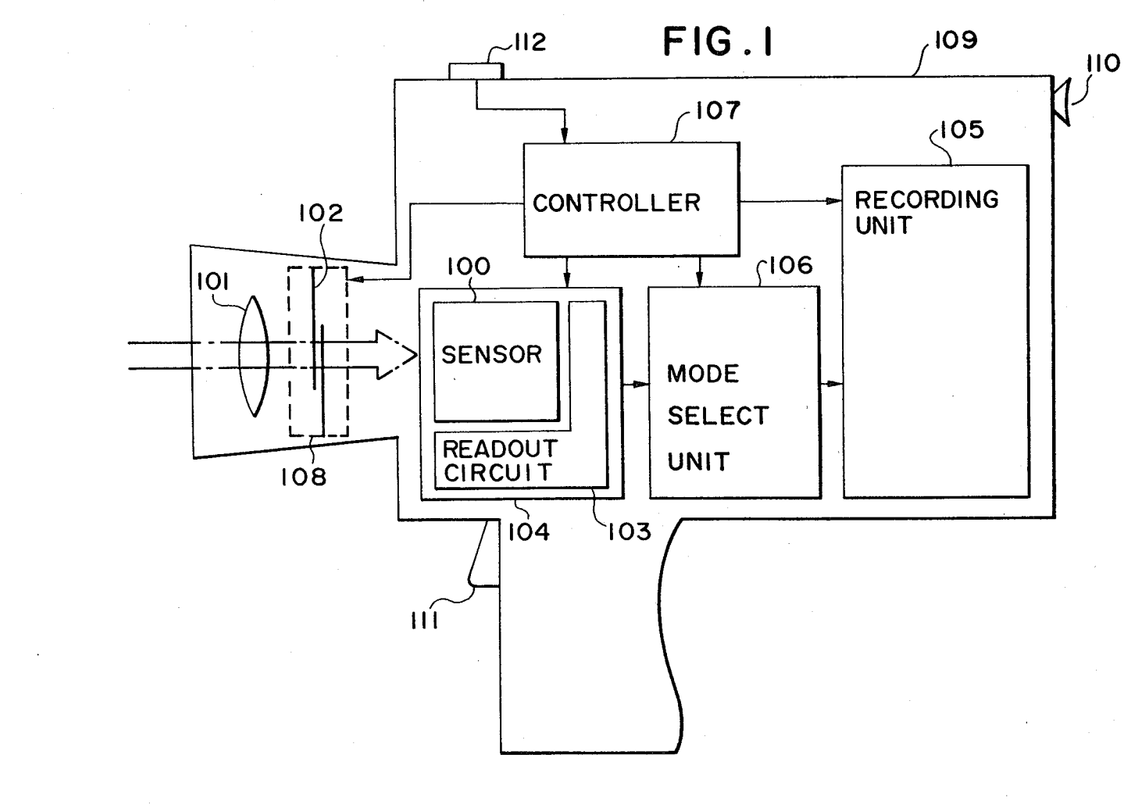
FIG. 1 is a block diagram illustrating the basic arrangement of the electronic combination still and movie camera of the present invention.

FIG. 1 illustrates in block form the basic arrangement of the electronic combination still-movie camera of the present invention.

In FIG. 1, reference numeral 100 indicates a solid state image sensor or the like which adopts an XY addressing system or self-scanning system and by which the optical image of an object projected thereon through a camera lens 101 and a shutter 102 is spatially sampled corresponding to picture elements and converted into an electric signal. Reference numeral 103 designates a readout circuit by which, in the case of taking a still picture, information corresponding to the optical image, converted by the sensor 100 into an electric signal, is read out at a still-mode scanning speed i.e. at a low scanning speed of, for instance, 3 to 5 frames per second and, in the case of taking a motion picture, at a movie-mode scanning speed, e.g., at a high scanning speed of about 30 frames per second. A sensor unit 104 composed of the readout circuit 103 and the sensor 100 may also be formed by a TV camera tube, such as a vidicon.

Reference numeral 105 identifies a recording unit which records an input signal at a fixed speed and which is formed by, for instance, a simple magnetic recording device of audio grade. A mode select unit 106, disposed between the recording unit 105 and the sensor unit 104, is actuable for selecting the still or movie mode of operation. Thus, when the readout circuit 103 reads out the stored information of the sensor 100 at the still-mode scanning speed signals corresponding to all picture elements are provided to the recording unit 105 for storage and, in the case of reading out the stored information at the movie-mode scanning speed, a signal that at least one of the number of picture elements per frame and/or the number of quantized bits per picture element is smaller than in the case of taking a still picture, is applied to the recording unit 105. In other words, the quantity of information per frame in the movie mode is reduced as compared with that in the still mode. Accordingly, by setting the reduction ratio so that it may be of a value dependent on a difference between the still-mode and movie-mode scanning speeds, it is possible to record information of motion picture photography through the use of a simple recording system for still picture photography which records an input signal at a fixed speed.

The rate at which the number of picture elements and the number of quantized bits are reduced for decreasing the quantity of information per frame is determined in cosideration of the picture quality of a moving picture to be reproduced. The number of picture elements per frame is reduced by limiting the number of picture elements read out from the sensor 100 at the stage of accessing as described later, or by simultaneously reading out stored information of adjoining picture element cells and averaging them to obtain information corresponding to one picture element.

A control unit (or controller) 107 in FIG. 1 yields control signals for operating the sensor unit 104 and the mode select unit 106 in the still or movie mode, and control signals for respective parts of the electronic camera, such as the recording unit 105 and an exposure control unit 108. In FIG. 1, reference numeral 109 indicates generally a combination still-movie electronic camera; 110 designates a finder; 111 identifies a shutter button; and 112 denotes a mode change-over switch for switching between the still and movie modes of operation.

Figure 2A:
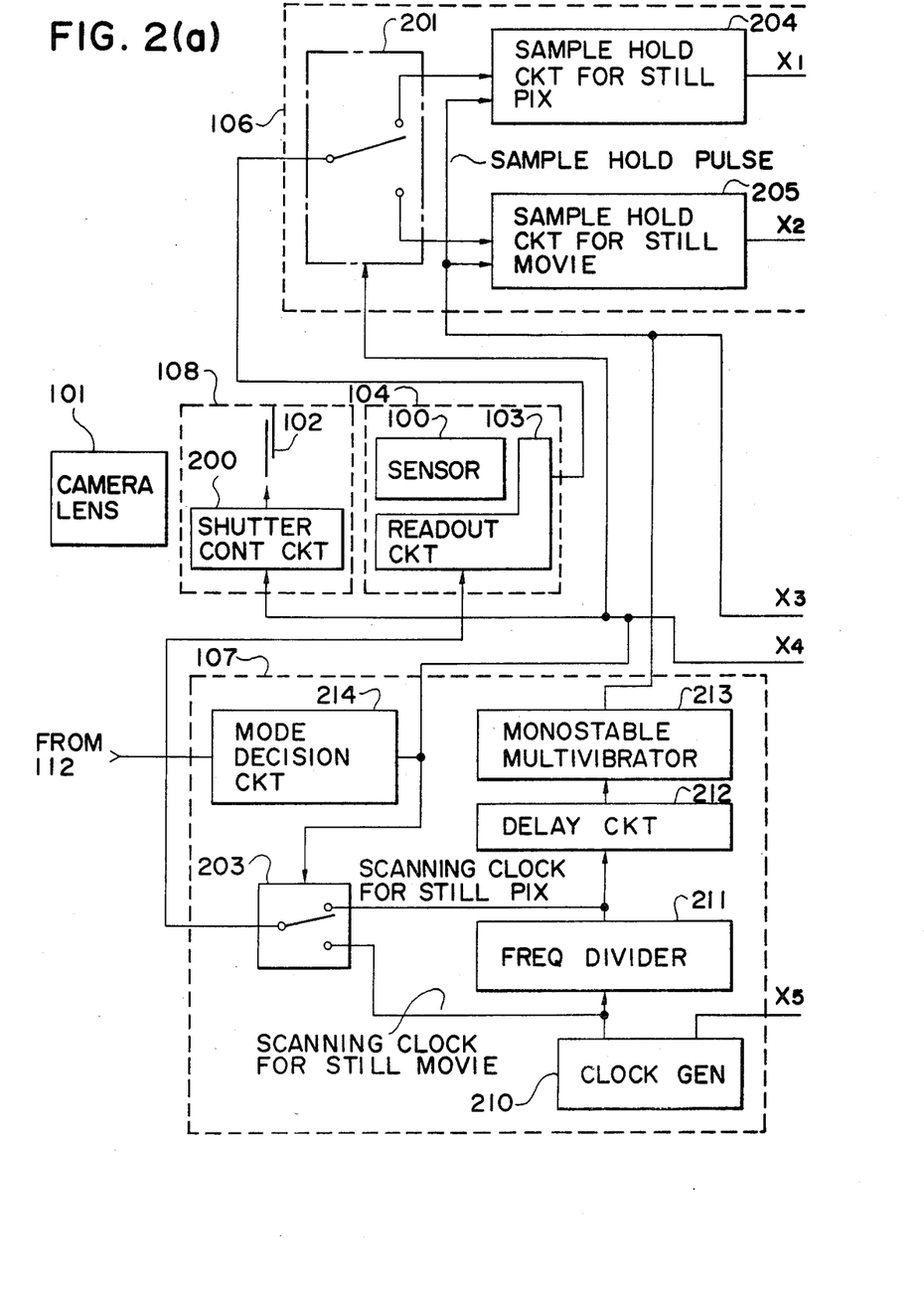
FIGS. 2(a) and 2(b) are block diagrams showing the principal part of an embodiment of the present invention.
Figure 2B:
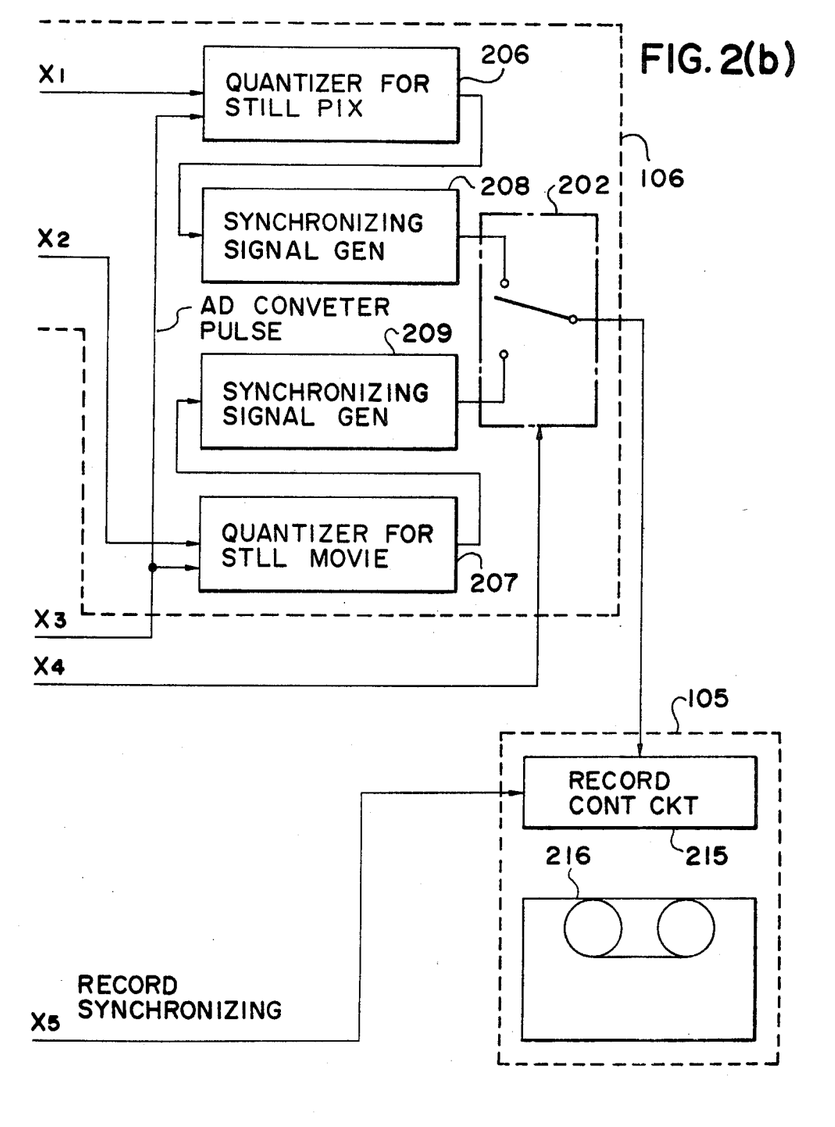

FIGS. 2(a) and 2(b) illustrate in more detail the principal part of an embodiment of the present invention, the parts corresponding to those in FIG. 1 being identified by the same reference numerals. Reference numeral 200 indicates a shutter control circuit; 201 to 203 designate changeover switches; 204 identifies a sample hold circuit for still pictures; 205 denotes a sample hold circuit for movies; 206 represents a quantizer for still pictures; 207 shows a quantizer for movies; 208 refers to a synchronizing signal generator for still pictures; 209 signifies a synchronizing signal generator for movies; 210 indicates a clock generator; 211 designates a frequency divider; 212 identifies a delay circuit; 213 denotes a monostable multivibrator; 214 represents a mode decision circuit; 215 shows a record control circuit; and 216 refers to a magnetic recorder.

A record synchronizing clock pulse is generated by the clock generator 210 in the control unit 107 and applied to the record control circuit 215 of the recording unit 105, causing the record control circuit 215 to perform fixed speed record control. Scanning clock pulses of a frequency suitable for movies are generated by the clock generator 210 and provided to one input terminal of the changeover switch 203 and the frequency divider 211. The divider 211 frequency divides the scanning clock pulses for movie by a frequency dividing ratio equal to the ratio between a maximum number of frames per second for still picture photography and the number of frames per second for motion picture photography, creating a scanning clock signal for still photography. The scanning clock signal thus obtained is applied to the other input terminal of the changeover switch 203 and the delay circuit 212. The delay circuit 212 compensates for delays of signals caused by the readout circuit 103 and the changeover switch 201. The output from the delay circuit 212, starts the monostable multivibrator 213, thus producing sample hold pulses for the sample hold circuits 204 and 205 and AD conversion pulses for the quantizers 206 and 207.

The mode decision circuit 214 in the control unit 107 decides the state of the mode changeover switch 112 and connects the changeover switches 201 to 203 to the still or motion picture photographing system. In the case of these switches being connected to the side of the still picture photographing system, a scanning clock signal for still photography is applied to the readout circuit 103 and the still picture circuits in the mode changeover unit 106 operate. When, the changeover switches are connected to the motion picture photographing system, the readout circuit 103 is supplied with a scanning clock signal for movies and, in the mode changeover unit 106, the circuits of the motion picture photographing system are put in operation.

Figure 3:
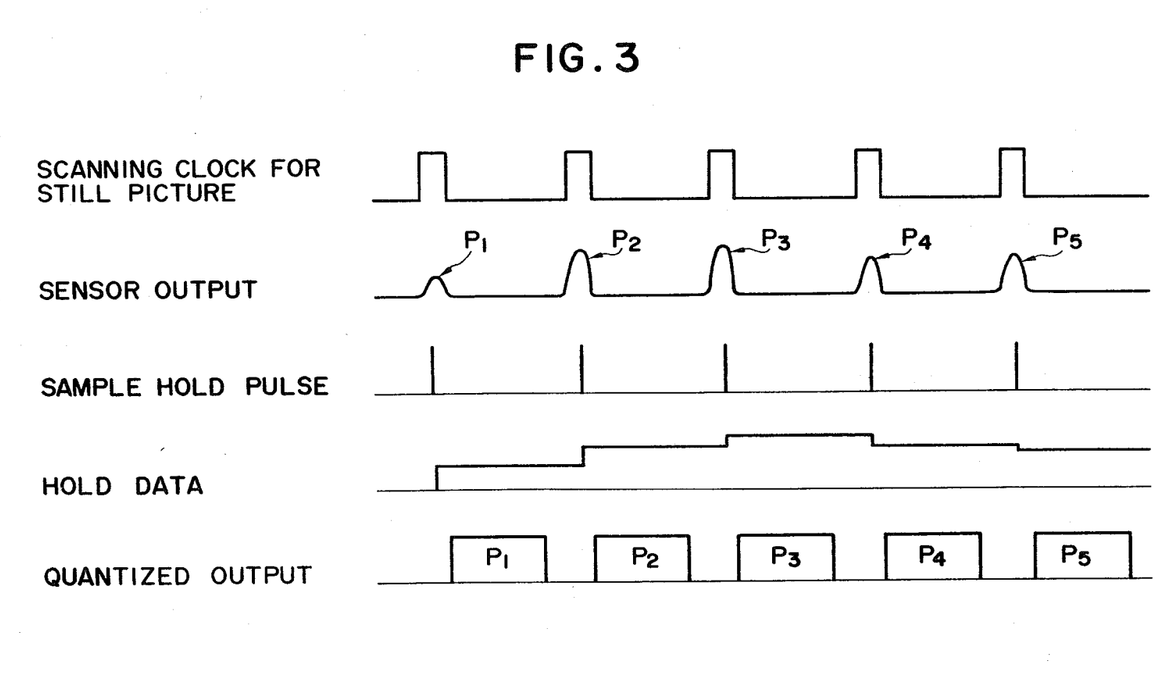
FIGS. 3 and 4 are schematic diagrams showing signal wave-forms which occur at respective parts of the embodiment of FIG. 2 in still and movie modes.
Figure 4:
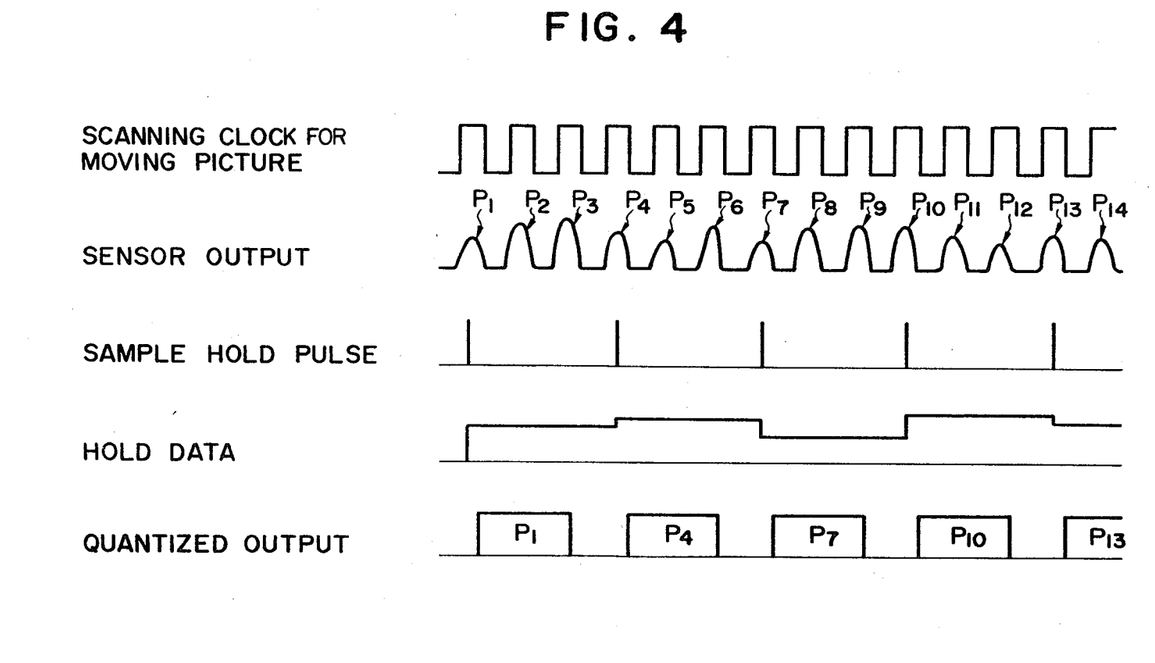

FIGS. 3 and 4 show signal waveforms which occur at respective parts of the camera of FIG. 2 in the still mode and the movie mode, respectively. In the still mode, since the sensor 100 is scanned by a slow scanning clock as shown in FIG. 3, stored information of picture elements $P_1$ to $p_n$ is read out at low speed as shown. In the movie mode, the sensor 100 is scanned by a fast scanning clock as depicted in FIG. 4 and, accordingly, stored information of the picture elements $P_1$ to $p_n$ is read out at high speed as shown. In the still mode, the stored information is sample-held by sample hold pulses, as depicted in FIG. 3, which are of the same frequency as the scanning clock for still photography, as illustrated, and the stored information of all the picture elements is provided to the quantizer for still photography 206, wherein it is quantized by a predetermined number of quantized bits as shown. On the other hand, in the movie mode the stored information is sample-held by sample hold pulses of a lower frequency than the sample hold pulses for still photographing and only some of the stored information is provided to the quantizer for movies 207, wherein it is quantized by a predetermined number of quantized bits as shown. Accordingly, the number of picture elements is reduced. By setting the number of quantized bits in the quantizer for movies 207 to be smaller than the number of quantized bits in the quantizer for still photography 206, the quantity of stored information per frame is further decreased. Incidentally, the sample hold circuits 204 and 205 may also be replaced with one sample hold circuits for both still and motion picture photographing. For example, in the case of recording analog quantities as of PWM (Pluse Width Modulation), the quantizers 206 and 207 are omitted.

Figure 5:
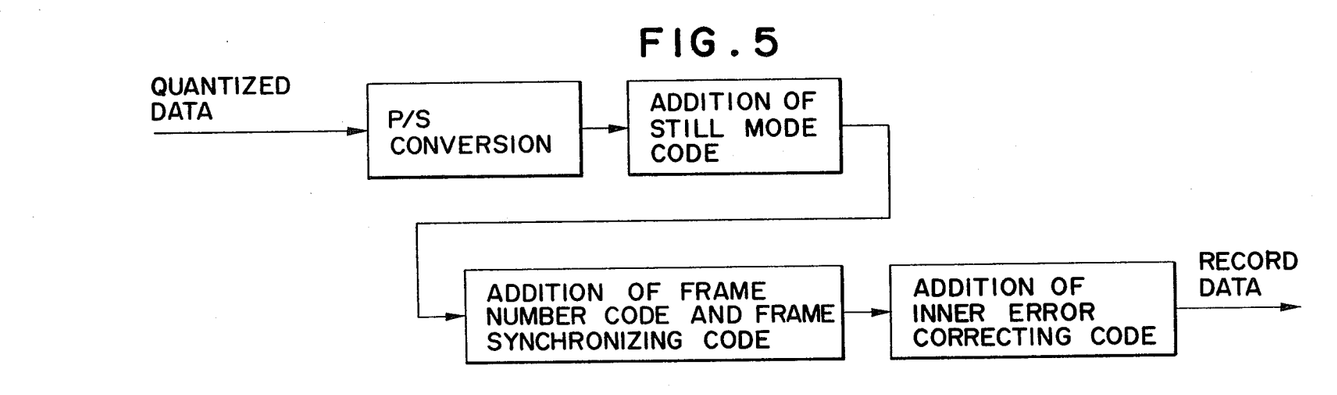
FIG. 5 is a block diagram showing functions of a synchronizing signal generator 208 for still photography.

FIG. 5 illustrates functional blocks of the synchronizing signal generator for still photography 208. Quantized data are subjected to parallel-serial conversion to obtain picture element data, which is added with a still mode code, a frame number code, a frame synchronizing code and an innererror correcting code, producing a signal of such a format as indicated by A in FIG. 6. In the synchronizing signal generator for movies 209, for instance, as shown in FIG. 7, quantized data are similarly subjected to parallel-serial conversion to obtain picture element data, which is added with a movie mode code, a vertical synchronizing code and, as required, a horizontal synchronizing code and an innererror correcting code, producing a signal of such a format as indicated by B in FIG. 8.

Figure 6:
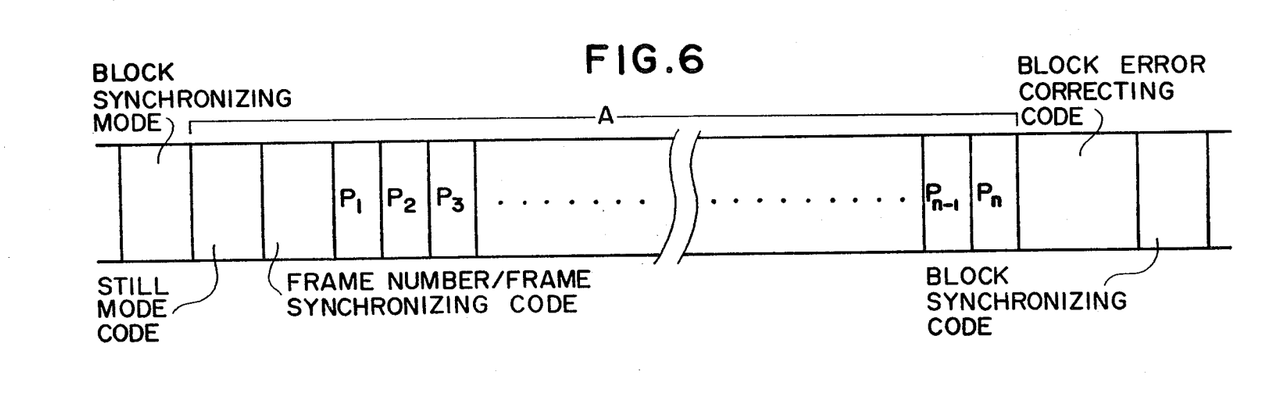
FIG. 6 is a schematic diagram showing an example of a still picture signal storage format.
Figures 7, 8:
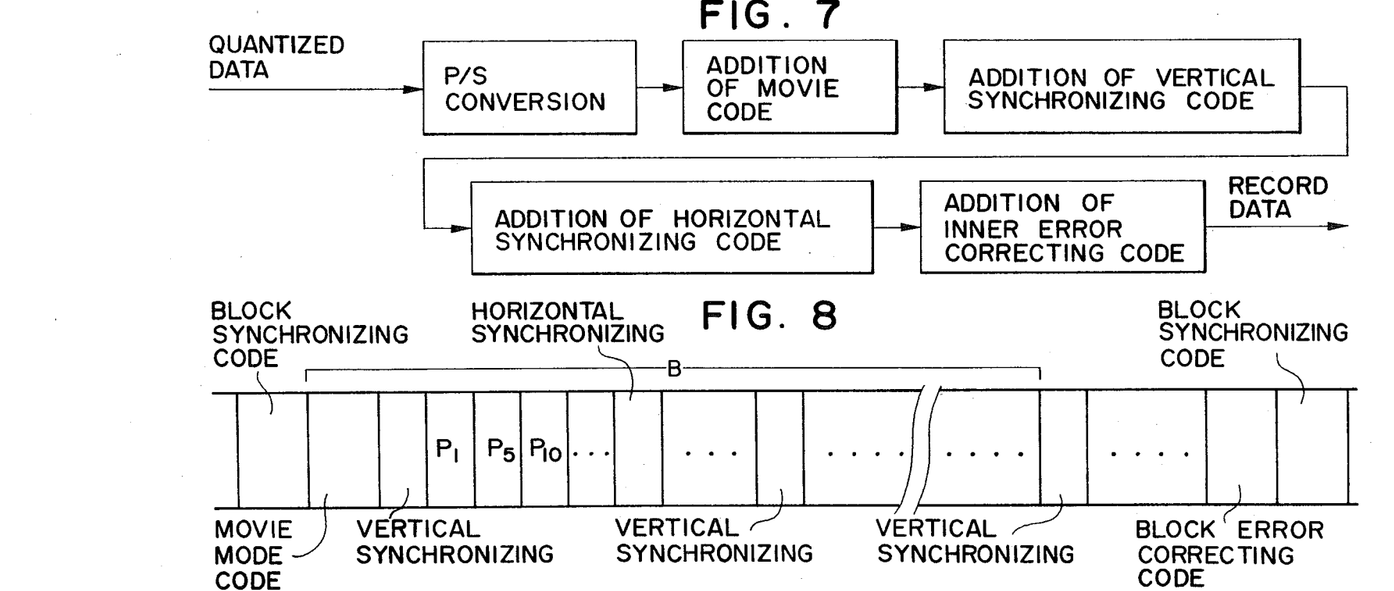
FIG. 7 is a block diagram showing functions of a synchronizing signal generator 209 for motion picture photography.
FIG. 8 is a schematic diagram showing an example of a movie signal storage format.
Figure 9:
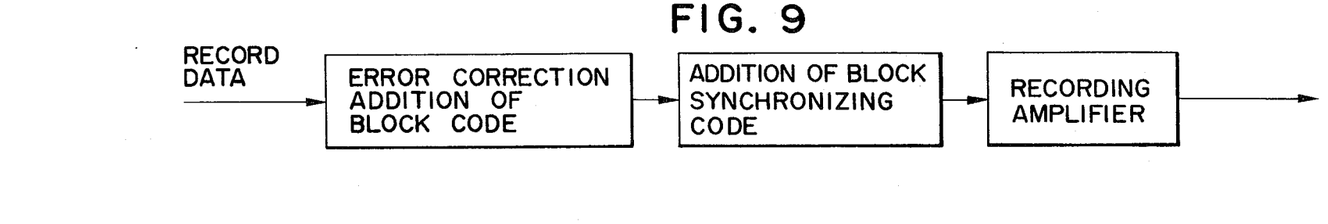
FIG. 9 is a block diagram showing functions of a storage control circuit 215.

The record control circuit 215 in FIG. 2b is supplied with a record synchronizing clock signal, receives input information at a fixed speed regardless of whether the system is in the still mode or in the movie mode, and adds the input information with an error correction code, a block clode and a block synchronizing code as shown in the functional block diagram of FIG. 9, producing signals of such formats as depicted in FIGS. 6 and 8. The signals thus obtained are recorded by the magnetic recorder 216. In this case, the number of picture elements per frame and the number of quantized bits per picture element in the movie mode are set so that bits of the same number may be added to the blocks in FIGS. 6 and 8 in both of the still mode and the movie mode, and dummy bits are inserted as required.

The shutter 102 in FIG. 2 serves to determine the exposure time when taking a still picture and, in the case of taking a motion picture, it is used as an iris of the sensor when the sensor is not used. The shutter 102 may also be adapted so that it is opened in the movie mode or set at the position of a bulb by the depression of a shutter button. Such an operation of the shutter is controlled by the shutter control circuit 200.

As will be appreciated from the foregoing description, according to the present invention, in the case of signals being read out from the sensor at the still-mode scanning speed, the signals corresponding to all picture elements are provided to the recording unit and, in the case of signals being read out from the sensor at the movie-mode scanning speed, a signal in which at least one of the number of picture elements per frame and the number of quantized bits per picture element is smaller than in the still mode of operation are provided to the recording unit. Therefore, one frame of still photography and a required number of frames of motion picture photography, for instance, ten frames, can be recorded by the same recording abilities, for example, the same tape speed and the same tape length. Accordingly, both still and motion picture can be taken through the use of a simple magnetic recording device of audio grade. Moreover, since the recording speed of the recording unit is the same in the still mode and in the movie mode, the present invention is free from such problems that the camera becomes bulky and expensive due to changing of the recording speed. Accordingly, it is possible with the present invention to offer a small and inexpensive electronic combination still-movie camera.

It will be apparent that many modifications and variations may be effected without departing from the scope of the novel concepts of the present invention.

What is claimed is:

1. A combination still and motion picture electronic camera/recorder comprising:

a sensor for spatially sampling an optical image corresponding to picture elements to convert it into an electric signal;

a readout circuit, operatively connected to said sensor, for reading out stored information signals of the sensor at a still-mode scanning speed in the case of taking a still picture and for reading out the stored information of the sensor at a movie-mode scanning speed in the case of taking a motion picture;

a control unit, operatively connected to said readout circuit, for generating scanning synchronizing signals for still pictures for operating the readout circuit at the still-mode scanning speed and scanning synchronizing signals for motion pictures for operating the readout circuit at the movie-mode scanning speed;

a mode select unit, operatively connected to said readout circuit and said control unit, for sending to the recording unit, in accordance with the scanning synchronizing signals for still pictures, information signals corresponding to all picture elements in the case of signals being read out from the sensor by the readout circuit at the still-mode scanning speed and for sending to the recording unit, in accordance with the scanning synchronization signals for motion pictures, information signals such that at least one of the number of picture elements per frame and the number of quantized bits per picture element is smaller than the number of picture elements per frame and/or the number of quantized bits per picture element in the case of taking a still picture when the information signals are read out from the sensor by the readout circuit at the movie-mode scanning speed; and a recording unit, operatively connected to said control unit and said mode select unit, for recording signal at a fixed speed.

2. A combination still and motion picture electronic camer/recorder according to claim 1, wherein the recording unit is a simple recording device of audio grade.

3. A combination still and motion picture camera/recorder according to claim 1, wherein the mode select unit includes a mode select section for still pictures composed of a sample hold circuit, a quantizer for quantizing the sample and hold circuit output and a synchronizing signal generator for adding a synchronizing signal to the quantizer output, a mode select section for motion pictures composed of a sample hold circuit, a quantizer for quantizing the sample hold circuit output and a synchronizing signal generator for adding a synchronizing signal to the quantizer output, and a mode changeover switch acutable for selectively operating the mode select section for still pictures and the mode select section for motion pictures, wherein the sample hold pulses of the sample hold circuit for still pictures and the sample hold circuit for motion pictures are of the same frequency, and wherein the number of quantized bits of the quantizer for motion picture is smaller than the anumber of quantized bits of the quantizer for still pictures.

4. A combination still picture electronic camera/recorder according to claim 3, wherein said control unit generates record synchronizing signals for causing the recording unit to perform a fixed speed recording operation, sample hold pulses for the sample hold circuits for still and motion pictures, and AD conversion pulses for the quantizers for still and motion pictures.

* * * * *